Dec. 15, 1931.    K. GORDON    1,836,659
PRODUCTION OF HYDROGEN AND GASES CONTAINING HYDROGEN
Filed Dec. 8, 1928
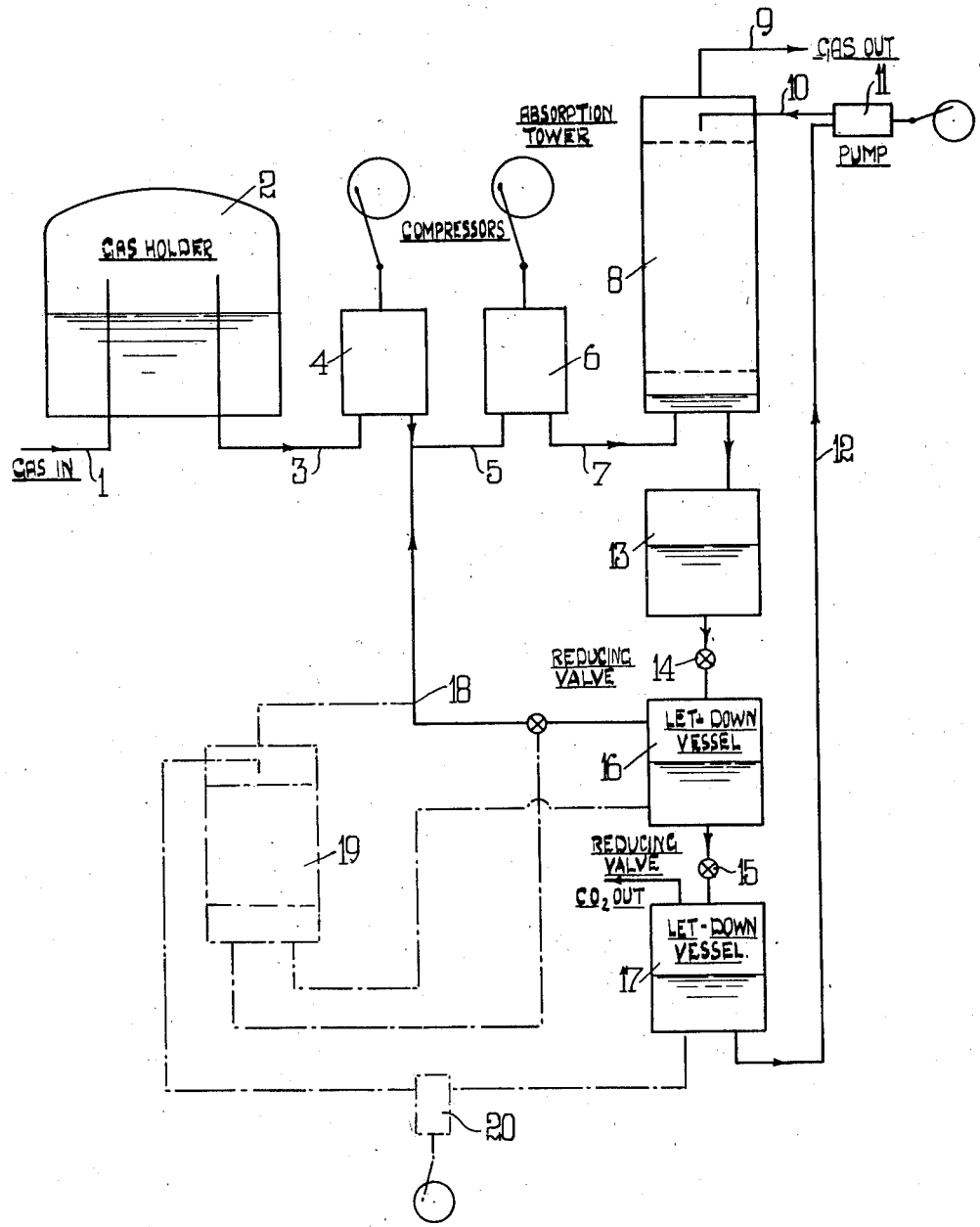
Inventor
Kenneth Gordon
by Steward & McKay
his attorneys Patented Dec. 15, 1931

1,836,659

UNITED STATES PATENT OFFICE

KENNETH GORDON, OF NORTON-ON-TEES, ENGLAND, ASSIGNOR TO IMPERIAL CHEMICAL INDUSTRIES LIMITED, OF LONDON, ENGLAND

PRODUCTION OF HYDROGEN AND GASES CONTAINING HYDROGEN

Application filed December 8, 1928, Serial No. 324,795, and in Great Britain January 31, 1928.

This invention relates to the production of hydrogen or gases containing hydrogen, such as are used in certain chemical operations conducted under high pressure, e. g. hydrogenation, the synthetic manufacture of ammonia and methanol etc.

It is known to prepare such mixtures starting from water gas by converting the carbon monoxide, or part of it, with steam in the well known manner. The gaseous mixture so obtained contains carbon dioxide and it is the customary practice to remove this undesirable constituent by washing the gas with water under pressure. In order, however, to reduce the concentration of carbon dioxide to a low figure the amount of washing water supplied must be rather large, representing for example a 100 per cent excess of the quantity theoretically required to remove the carbon dioxide in a counter-current absorption tower. Now the use of such a large quantity of washing water involves a serious loss of valuable hydrogen and it may be of other gases such as carbon monoxide and nitrogen since these gases are also absorbed by the water and cannot economically be recovered therefrom.

I have now found that a large proportion of the valuable hydrogen existing in an absorbed state in the solution issuing from a high-pressure carbon dioxide absorption tower, may be recovered if the pressure on the said solution is reduced not all at once to the atmospheric, but in stages. The invention is based on the discovery that the gas liberated on partially releasing the pressure on the washing solution contains a high proportion of hydrogen and it may be other gases such as nitrogen and carbon monoxide, and a relatively small proportion of carbon dioxide.

On the other hand the gas liberated in the subsequent reduction of the washing solution to atmospheric pressure contains largely carbon dioxide with only relatively insignificant amounts of hydrogen and other gases. I therefore employ the step of releasing the pressure in stages, or to a limited extent.

The following examples illustrate the invention. The gas volumes in all cases are those measured at standard temperature and pressure.

Example 1

290 cubic metres of a gaseous mixture composed of 49.3 cubic metres of nitrogen, 147.8 cubic metres of hydrogen, 84.2 cubic metres of carbon dioxide and 8.7 cubic metres of carbon monoxide, is compressed to 50 atmospheres and is washed with 10 cubic metres of water in a counter-current absorption tower. Part of the gas dissolves and the solution obtained is allowed to expand to a pressure of 20 atmospheres and the gas given off is collected; it consists of 3.5 cubic metres of hydrogen, 1.1 cubic metres of nitrogen, 4.6 cubic metres of carbon dioxide and 0.2 cubic metres of carbon monoxide. This gas is thus richer in hydrogen than the gas originally present in dissolved form. The total amount of this gas is 9.4 cubic metres, i. e. 3.25 per cent. of the gas entering the absorption tower. By returning it to the compressors (preferably at the 20 atmospheres stage of compression) a saving of 2.33 per cent. of the valuable hydrogen is effected. The gas evolved in the subsequent reduction of pressure on the solution, which may be effected in a Pelton wheel, contains about 97 per cent. of carbon dioxide and may profitably be used for carbonating ammonia liquor as a step in the manufacture of ammonium sulphate from gypsum.

Example 2

100 cubic metres of a gaseous mixture composed of 52 cubic metres of hydrogen, 27 cubic metres of carbon monoxide, 16 cubic metres of carbon dioxide and 5 cubic metres of nitrogen and methane taken together, is compressed to 200 atmospheres and is washed with 2 cubic metres of water in a counter-current absorption tower. Part of the gas dissolves, giving a solution containing 16 cubic metres of carbon dioxide 3.4 cubic metres of hydrogen 2.0 cubic metres of carbon dioxide and 0.6 cubic metres of nitrogen and methane taken together. The solution obtained is allowed to expand to a pressure of 25 atmospheres and the gas given off is collected: it consists of 3.2 cubic metres of hydrogen, 1.7 cubic metres of carbon monoxide, 2.6 cubic metres of carbon dioxide and 0.4 cubic metres of nitrogen and methane taken together. The total amount of this gas is 7.9 cubic metres, i. e. 7.9 per cent. of the gas entering the absorption tower. By returning it to the compressors a saving of 6 per cent. of the valuable hydrogen and 6 per cent. of the valuable carbon monoxide is effected. The gas evolved in the subsequent reduction of pressure on the solution from 25 atmospheres to 1 atmosphere amounts to 12 cubic metres, composed of 11.2 cubic metres of carbon dioxide, 0.2 cubic metres of hydrogen 0.3 cubic metres of carbon monoxide, and 0.2 cubic metres of nitrogen and methane taken together. The residue of the carbon dioxide, amounting to 2.4 cubic metres, is retained by the washing water after its pressure has been reduced to 1 atmosphere.

Instead of water in the above examples use may be made of aqueous solutions of substances which increase the solubility of carbon dioxide and/or decrease the solubility of the other components of the gas mixtures.

In some cases it may be advantageous to release the pressure on the washing solution in several stages, collecting the gases evolved during each stage and utilizing them for any convenient purpose having regard to their various compositions.

An important feature of the invention consists in washing under pressure a gas containing hydrogen, releasing the pressure in stages, and returning the first fraction or fractions of released gas to the appropriate stage of the compressor or to a further washer.

The invention is illustrated in the accompanying drawing. Gas containing carbon dioxide is supplied by a pipe 1 to a gas holder 2 and withdrawn by pipe 3 to the first stage 4 of a multi-stage compressor where it is compressed say to 20 atmospheres. It leaves this by pipe 5 and passes to the second stage 6, and leaving this under a pressure of say 200 atmospheres, passes through pipe 7 to a counter current scrubbing tower 8. Here it meets with a counter current of water supplied from pump 11 through pipe 10. The carbon dioxide and a fraction of the other components dissolve, and the decarbonated gas leaves the system by pipe 9. The liquor, containing dissolved gas flows into reservoir 13 and thence through valve 14 into the intermediate let down vessel 16. This is maintained at a pressure of 20 atmospheres, and the gas evolved passes through pipe 18, and joins the gas leaving 4. The residual gas solution passes into a second let down vessel 17 where it is let down to atmospheric pressure through valve 15. 17 is connected with pump 11 by pipe 12 so that the same amount of water is circulated in the system. Alternatively the gases evolved may be washed in an additional tower 19 fed by a pump 20 before returning them to the system.

In the appended claims by "an aqueous liquid" is to be understood either water or an appropriate solution.

I declare that what I claim is:—

1. Process for the separation of gases containing hydrogen, and carbon dioxide which consists in scrubbing the gases with an aqueous liquid under pressure to dissolve part of said gases, releasing the pressure on the resulting gas solution in stages, collecting the gases evolved in each stage, re-compressing the gas relatively rich in hydrogen first evolved, and returning same to the washing process.

2. Process for the separation of gases containing hydrogen, and carbon dioxide which consists in scrubbing the gases with an aqueous liquid under pressure to dissolve part of said gases, releasing the pressure on the resulting gas solution in stages, collecting the gases evolved in each stage and leading the gas relatively rich in hydrogen first evolved to a separate washer.

3. Process for the separation of gases containing hydrogen, and carbon dioxide which consists in scrubbing the gases with an aqueous liquid under pressure to dissolve part of said gases, releasing the pressure on the resulting gas solution in stages, collecting the gases evolved in each stage and leading the gas relatively rich in hydrogen first evolved to a separate washer, recompressing same and returning it to the original washing process.

4. Process for the separation of gases containing hydrogen, and carbon dioxide which consists in scrubbing the gases with an aqueous liquid under pressure, releasing the pressure on the resulting gas solution in stages, collecting the gases evolved in each stage, and returning the gas relatively rich in hydrogen first evolved to the appropriate stage of the main compressor.

5. Process for the purification of gases containing carbon dioxide which consists in compressing said gases in several stages including a stage of about 20 atmospheres, to about 200 atmospheres pressure, scrubbing them with an aqueous liquid to dissolve chiefly the carbon dioxide, releasing the pressure on the solution thus obtained in two stages, including a first let down to about 20 atmospheres and a second let down to atmospheric pressure, and leading the gases evolved in the first let down to the 20 atmospheres stage of the compression.

In witness whereof, I have hereunto signed my name this 20th day of November, 1928.

KENNETH GORDON.